US012697907B2

(12) United States Patent (10) Patent No.: US 12,697,907 B2
Lee et al. (45) Date of Patent: Aug. 4, 2026

(54) LATCH ASSEMBLY CAPABLE OF MAINTAINING LOCKING STATE

(71) Applicants:Hyundai Motor Company, Seoul (KR); Kia Corporation, Seoul (KR); Daechang Seat Co., LTD-Dongtan, Hwaseong-si (KR); Hyundai Transys Inc., Seosan-si (KR)

(72) Inventors: Hyeok-Seung Lee, Seoul (KR); Sang-Do Park, Suwon-si (KR); Ho-Suk Jung, Hwaseong-si (KR); Mu-Young Kim, Osan-si (KR); Jun-Hwan Lee, Seoul (KR); Chan-Ho Jung, Gunpo-si (KR); Jun-Young Yun, Osan-si (KR); Dong-Jin Kim, Anseong-si (KR); In-Chang Hwang, Hwaseong-si (KR)

(73) Assignees: HYUNDAI MOTOR COMPANY, Seoul (KR); KIA CORPORATION, Seoul (KR); DAECHANG SEAT CO., LTD-DONGTAN, Hwaseong (KR); HYUNDAI TRANSYS INC., Seosan-si (KR)

( * ) Notice: Subject to any disclaimer, the term of this patent is extended or adjusted under 35 U.S.C. 154(b) by 437 days.

(21) Appl. No.: 18/104,862

(22) Filed: Feb. 2, 2023

(65) Prior Publication Data

US 2023/0365035 A1 Nov. 16, 2023

(30) Foreign Application Priority Data

May 16, 2022 (KR) ........................ 10-2022-0059522

(51) Int. Cl.
*B60N 2/433* (2006.01)
*E05B 85/26* (2014.01)

(52) U.S. Cl.
CPC .............. *B60N 2/433* (2013.01); *E05B 85/26* (2013.01)

(58) Field of Classification Search
CPC .......... E05B 77/02; E05B 77/04; E05B 77/06; E05B 85/20; E05B 85/24; E05B 85/243;
(Continued)

(56) References Cited

U.S. PATENT DOCUMENTS 4,703,961 A * 11/1987 Weinerman ............... E05C 3/24
292/216
5,092,639 A * 3/1992 Di Giusto ............... E05B 85/26
292/216
(Continued)

FOREIGN PATENT DOCUMENTS

CN 114450460 B * 5/2023 ......... E05B 17/0041
DE 102007024564 A1 * 11/2008 ............. E05B 77/36
(Continued)

*Primary Examiner* — Alyson M Merlino
(74) *Attorney, Agent, or Firm* — Morgan, Lewis & Bockius LLP

(57) ABSTRACT

A latch assembly capable of maintaining a locking state includes a locking plate including a striker selectively disposed in and out of the locking plate, and rotatably provided, a pawl engaged with the locking plate to prevent rotation of the locking plate, maintaining a locking state in which the locking plate restrains the striker, and separated from the locking plate when being rotated by a cable coupled to the pawl to release restraint of the striker from the locking plate, being in an unlocking state, and a locking maintenance member configured to prevent the rotation of the pawl and the rotation of the locking plate in the locking state, and enable the rotation of the pawl and the rotation of the locking plate when starting to be unlocked from the locking state, which is provided between the pawl and the locking plate.

12 Claims, 12 Drawing Sheets

(58) Field of Classification Search
CPC ... E05B 85/26; E05B 85/245; B60N 2/01583;
B60N 2/366; B60N 2/2245; B60N 2/433
See application file for complete search history.

(56) References Cited

U.S. PATENT DOCUMENTS

| | | | |
|---|---|---|---|
| 6,749,234 B2 | 6/2004 | Bruce | |
| 7,575,280 B2 * | 8/2009 | Palomba | B60N 2/01583 |
| | | | 297/336 |
| 7,954,898 B2 * | 6/2011 | Van De Geer | B60N 2/01583 |
| | | | 292/216 |
| 8,235,428 B2 | 8/2012 | Hunt et al. | |
| 8,672,386 B2 | 3/2014 | Yoo et al. | |
| 2003/0222462 A1 | 12/2003 | Bruce | |
| 2012/0080928 A1 | 4/2012 | Yoo et al. | |
| 2021/0156175 A1 | 5/2021 | Ishiguro et al. | |
| 2022/0162889 A1 * | 5/2022 | Linnåsen | E05B 85/243 |

FOREIGN PATENT DOCUMENTS

| | | | | |
|---|---|---|---|---|
| DE | 102019128298 A1 * | 4/2021 | | |
| DE | 102019128633 A1 * | 4/2021 | | |
| FR | 2472651 A1 * | 7/1981 | | |
| JP | 3933898 B2 | 6/2007 | | |
| JP | 2019-019452 A | 2/2019 | | |
| JP | 6777679 B2 | 10/2020 | | |
| KR | 10-2012-0033822 A | 4/2012 | | |

* cited by examiner

LATCH ASSEMBLY CAPABLE OF MAINTAINING LOCKING STATE

CROSS-REFERENCE TO RELATED APPLICATION

The present application claims priority to Korean Patent Application No. 10-2022-0059522, filed on May 16, 2022, the entire contents of which is incorporated herein for all purposes by this reference.

BACKGROUND OF THE PRESENT DISCLOSURE

Field of the Present Disclosure

The present disclosure relates to a latch assembly that maintains an angle of a seatback in a seat for a vehicle, and more specifically, to a latch assembly capable of maintaining a locking state thereof, which may prevent an unintended release to maintain the locking state.

Description of Related Art

A latch assembly is applied to a seat for a vehicle to lock or unlock a state of the seat.

As shown in FIG. 1, FIG. 2, and FIG. 3, the latch assembly includes a base 111, and a locking plate 112 and a pawl 114 provided at the base 111 to be rotatable to each other with respect to the base 111. The locking plate 112 is rotatably provided on the base 111 through a lower mounting shaft 112a, and the pawl 114 is rotatably provided on the base 111 through an upper mounting shaft 114a. The locking plate 112 and the pawl 114 are provided in the form of being engaged with each other, and the locking plate 112 and the pawl 114 are elastically supported to be engaged with each other by a torsion spring 118. A striker 113 is restrained in a striker groove 112b formed in the locking plate 112, so that the state of the seat is locked.

When a cable 115 connected to the pawl 114 is pulled by an passenger's operation from the state of FIG. 1, as the pawl 114 rotates (refer to FIG. 2 and FIG. 3), the engagement of the pawl 114 and the locking plate 112 is released, and the striker 113 is separated from the striker groove 112b, so that the locking is released.

Meanwhile, the latch assembly according to the related art may allow the rotation of the locking plate 112 by the rotation of the pawl 114 in addition to a case where a passenger pulls the cable 115. The pawl 114 may be rotated by inertia when a vehicle suddenly stops or shock due to collision of baggage to the seat. Accordingly, there is a problem in that as the restraint of the striker 113 is released, the seatback is folded in a forward direction, injuring a passenger.

To prevent the present problem, as shown in FIG. 4, a tension spring 119 is added between a pawl cable pin 114b and the locking plate 112 to solve the above-described problem. However, there is a problem in that as the tension spring 119 is added, an operating force of pulling the cable 115 increases.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a latch assembly configured for maintaining a locking state so as not to increase an operating force while preventing a locking from being released by inertia or collision.

There is provided a latch assembly configured for maintaining a locking state according to an exemplary embodiment of the present disclosure including: a locking plate including a striker selectively disposed in and out of the locking plate, and rotatably provided; a pawl engaged with the locking plate to prevent rotation of the locking plate, maintaining a locking state in which the locking plate restrains the striker, and separated from the locking plate when being rotated by a cable coupled to the pawl to release restraint of the striker from the locking plate, being in an unlocking state of the latch assembly; and a locking maintenance member configured to prevent a rotation of the pawl and the rotation of the locking plate in a locking state by restraining the rotation of the pawl and the rotation of the locking plate, and enable the rotation of the pawl and the rotation of the locking plate when starting to be unlocked from the locking state, which is provided between the pawl and the locking plate.

The locking maintenance member enables the rotation of the pawl and the rotation of the locking plate when the cable is pulled so that the pawl is rotated.

The locking maintenance member is a pawl pin provided to be simultaneously fitted into the pawl and the locking plate in the locking state, and provided to be fitted into one of the pawl and the locking plate when the cable is pulled.

A locking groove selectively accommodating a first end portion of the pawl pin therein is formed in the locking plate, a pawl guide groove selectively accommodating a second end portion of the pawl pin is formed in the pawl, and the first end portion of the pawl pin is located in the locking groove, and the second end portion of the pawl pin is located in the pawl guide groove in the locking state, preventing the rotation of the pawl and the rotation of the locking plate.

When unlocking of the latch assembly starts, the pawl pin is located inside one of the locking groove and the pawl guide groove.

The pawl pin is interlocked with the cable, and located inside one of the locking groove and the pawl guide groove when the cable is pulled.

An end portion of the cable is fixed to a pawl cable pin provided on the pawl to be slidable with a predetermined distance in the pawl, and the pawl pin is interlocked with the pawl cable pin.

A pin guide groove is formed in the pawl in a form of a slot, and the pawl cable pin is slidably provided in the pin guide groove.

A bracket, which is fastened at a distance at which the pawl cable pin and the pawl pin are spaced so that the pawl cable pin and the pawl pin are interlocked with each other, is provided.

The locking groove and the pawl guide groove are formed in the locking plate and the pawl, respectively to communicate with each other in the locking state.

Meanwhile, there is provided a latch assembly configured for maintaining a locking state according to an exemplary embodiment of the present disclosure including: a locking plate including a striker selectively disposed in and out of the locking plate, and rotatably provided; a pawl engaged with the locking plate to prevent rotation of the locking plate, maintaining a locking state in which the locking plate restrains the striker, and separated from the locking plate by being rotated by a cable to release the restraint of the striker from the locking plate, being in an unlocking state of the latch assembly; and a locking maintenance member simultaneously engaged with the locking plate and the pawl until the cable is pulled, and engaged with one of the locking plate and the pawl when the cable is pulled.

The locking maintenance member is a pawl pin provided to be fitted into one of the pawl and the locking plate when the cable is pulled.

A locking groove and a pawl guide groove accommodating a first portion and a second portion of the pawl pin respectively are formed in the locking plate and the pawl, respectively.

A pawl cable pin provided at an end portion of the cable and the pawl pin are connected to each other by a bracket so that the pawl pin is interlocked with the cable.

The pawl cable pin is slidably provided in a pin guide groove formed in the pawl in a form of a slot.

According to the latch assembly configured for maintaining the locking state according to an exemplary embodiment of the present disclosure including the above configuration, the pawl pin may be fitted between the locking plate and the pawl in the locking state to prevent the rotation of the locking plate and the pawl, preventing the unlocking of the latch assembly.

Furthermore, when the cable is pulled to release the latch assembly, the pawl pin is separated from the locking plate along with the movement of the cable, so that the latch assembly is released.

The pawl pin may be separated from the locking plate even without increasing the operating force of pulling the cable, so that the operating force is not increased.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
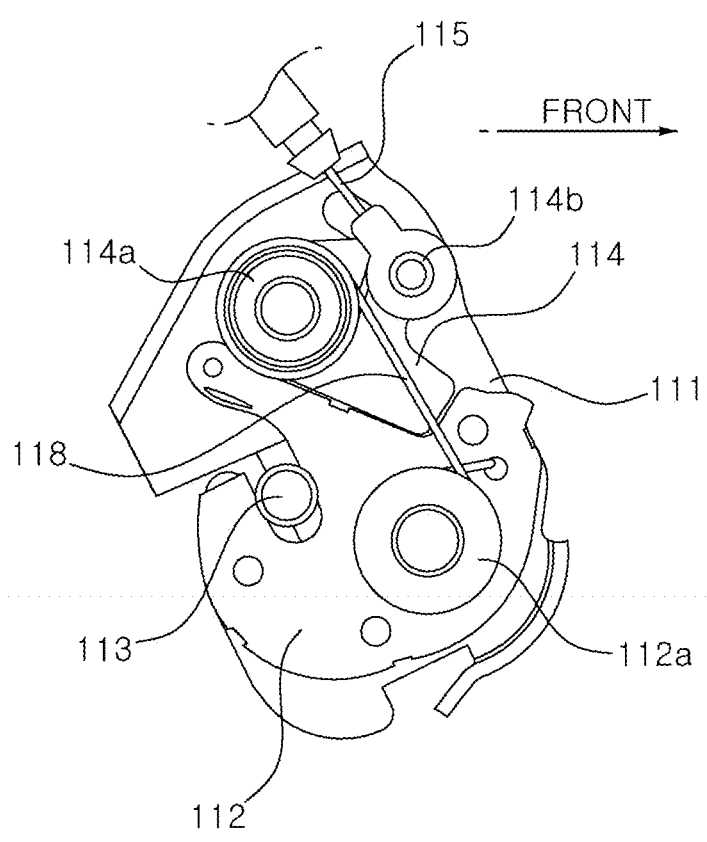
FIG. 1 is a plan view showing a state in which a latch assembly according to the related art is locked.
Figure 2:
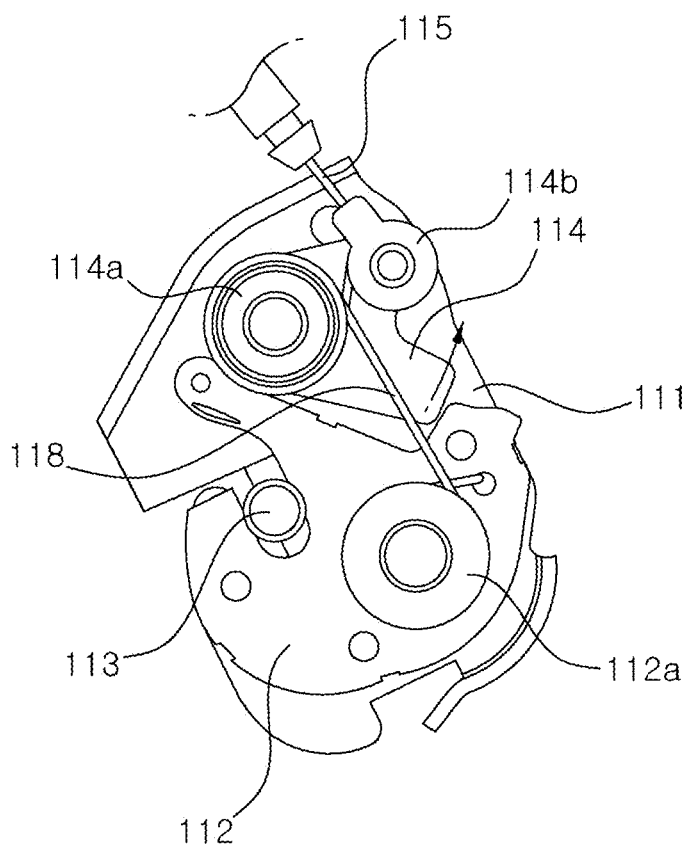
FIG. 2 is a plan view showing a state in which the latch assembly according to the related art start to be unlocked.
Figure 3:
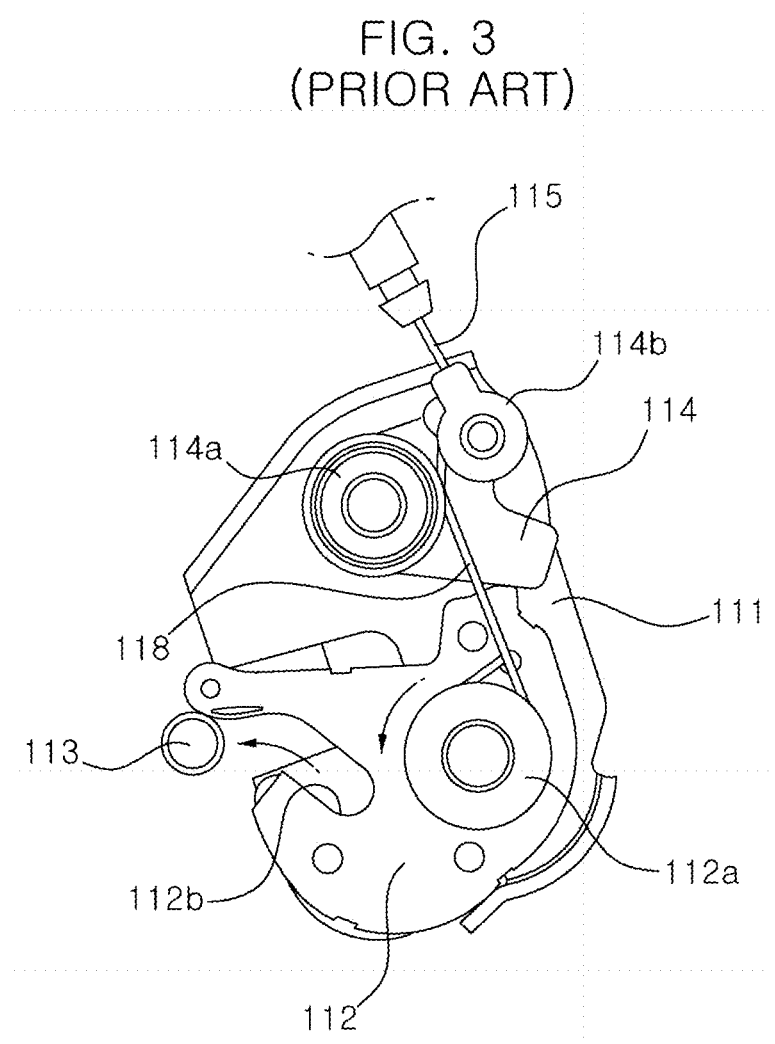
FIG. 3 is a plan view showing a state in which the latch assembly according to the related art is unlocked.
Figure 4:
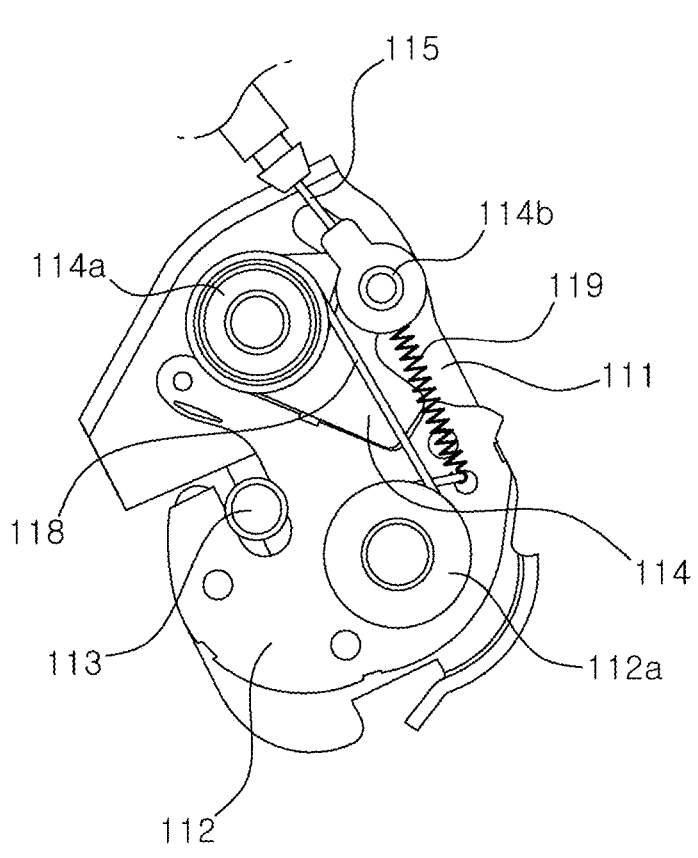
FIG. 4 is a plan view showing a state in which a tension spring is added to the latch assembly according to the related art.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, a latch assembly configured for maintaining a locking state according to an exemplary embodiment of the present disclosure will be described in detail with reference to the accompanying drawings.

A latch assembly configured for maintaining a locking state according to an exemplary embodiment of the present disclosure includes a locking plate 12 including a striker 13 put in and out, and rotatably provided, a pawl 14 engaged with the locking plate 12 to prevent the rotation of the locking plate 12, maintaining a locking state in which the locking plate 12 restrains the striker 13, and separated from the locking plate 12 when being rotated by a cable 15 to release the restraint of the striker 13 from the locking plate 12, being in an unlocking state, and a locking maintenance member 17 configured to prevent the rotation of the pawl 14 and the locking plate 12 in the locking state, and enable the rotation of the pawl 14 and the locking plate 12 when starting to be unlocked from the locking state, which is provided between the pawl 14 and the locking plate 12.

The locking plate 12 is rotatably provided on a base. The locking plate 12 is rotatably provided on a base 11 through a lower mounting shaft 12a. The locking plate 12 is formed with a striker groove 12b to restrain the striker 13. The striker groove 12b is formed in a form of a slot with one end portion open so that the striker 13 may be put in and out of the locking plate 12. When the striker 13 is rotated at a certain angle to the locking plate 12 in a state in which the striker 13 is inserted into the striker groove 12b, the striker 13 is restrained inside the striker groove 12*b*, and the latch assembly is in a locking state.

When the locking plate 12 rotates in a direction opposite in a direction in which the striker 13 is restrained, the striker 13 is separated from the striker groove 12*b* and released from the restraint, so that the latch assembly is to be an unlocking state.

The pawl 14 is rotatably provided on the base 11. The pawl 14 is rotatably provided on the base 11 through an upper mounting shaft 14*a*. The pawl 14 comes into contact with the locking plate 12 to be engaged with the locking plate 12, preventing the rotation of the locking plate 12 so that the locking state is maintained.

The pawl 14 and the locking plate 12 are elastically supported rotatably in opposite directions through an elastic member such as a torsion spring 18. Furthermore, the pawl 14 is connected to the cable 15 so that a passenger unlocks the latch assembly. When the passenger operates a lever to unlock the latch assembly and thus the cable 15 is pulled, as the pawl 14 is rotated to release the engagement with the locking plate 12, the pawl 14 and the locking plate 12 are rotated in opposite directions and the latch assembly is in an unlocking state.

There was a problem in that the locking plate 12 and the pawl 14 locked to each other are unlocked by inertia due to a sudden stop or collision of luggage. To solve the present problem, a locking maintenance member 17 configured to simultaneously prevent the rotation of the pawl 14 and the locking plate 12 in the locking state, and enable the rotation of the pawl 14 and the locking plate 12 when starting to be unlocked from the locking state, is provided between the pawl 14 and the locking plate 12. In other words, the locking maintenance member 17 is simultaneously engaged with the locking plate 12 and the pawl 14 until the cable 15 is pulled, and is engaged with only any one of the locking plate 12 and the pawl 14 when the cable 15 is pulled.

The locking maintenance member 17 is fitted into the locking plate 12 and the pawl 14, respectively, in the locking state, and is provided to be fitted into only any one of the pawl 14 and the locking plate 12 when the cable 15 is pulled. As an example of the locking maintenance member 17, a portion of the locking maintenance member 17 is fitted into the pawl 14 and the locking plate 12, respectively, or the locking maintenance member 17 may be a pawl pin 17 fitted into any one of the pawl 14 and the locking plate 12.

The pawl pin 17 is interlocked with the cable 15, and in the locking state, a portion of the pawl pin 17 is simultaneously fitted into the pawl 14 and the locking plate 12, respectively to prevent the rotation of the pawl 14 and the locking plate 12, maintaining the locking state. To unlock the latch assembly, when the cable 15 is pulled, the pawl pin 17 may be alternatively fitted into only any one of the pawl 14 and the locking plate 12 so that the pawl 14 and the locking plate 12 may be rotated, unlocking the latch assembly.

Figure 10:
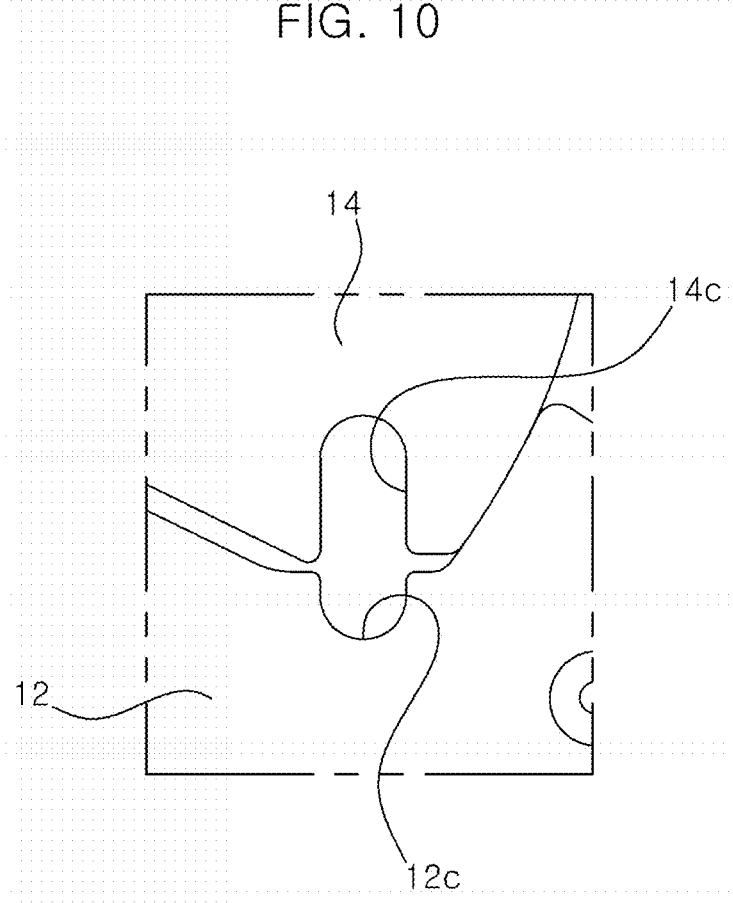
FIG. 10 is an enlarged view of main parts of FIG. 9.

A locking groove 12*c* and a pawl guide groove 14*c* are formed in the locking plate 12 and the pawl 14, respectively so that the pawl pin 17 is fitted into the locking plate 12 and the pawl 14 (see FIG. 10). The locking groove 12*c* is formed from the circumference of the locking plate 12 toward the inside of the locking plate 12 so that the pawl pin 17 is put in and out through the locking groove 12*c*. The pawl guide groove 14*c* is also formed from the circumference of the pawl 14 toward the inside of the pawl 14, so that the pawl pin 17 may be put in and out through the pawl guide groove 14*c*.

The locking groove 12*c* and the pawl guide groove 14*c* are formed in the locking plate 12 and the pawl 14 so that the latch assembly communicates with each other in the locking state.

Meanwhile, in the present disclosure, all of the pawl pin 17 is located inside the pawl 14 when the latch assembly starts to be unlocked.

Furthermore, the pawl pin 17 is interlocked with the cable 15, and is provided so that any one of the pawl 14 and the locking plate 12, for example, the pawl 14 is located therein when the cable 15 is pulled.

To interlock the pawl pin 17 and the cable 15, the cable 15 is provided to a bracket 16 so that the pawl cable pin 14*b* connected to the pawl 14 and the pawl pin 17 become one body.

Figure 7:
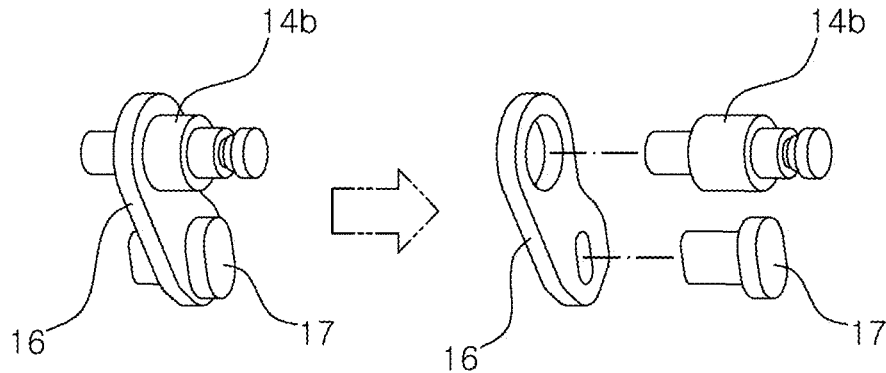
FIG. 7 is a perspective view and an exploded perspective view showing a state in which a pawl cable pin and a pawl pin are fastened to a bracket in the latch assembly configured for maintaining the locking state according to an exemplary embodiment of the present disclosure.
Figure 8:
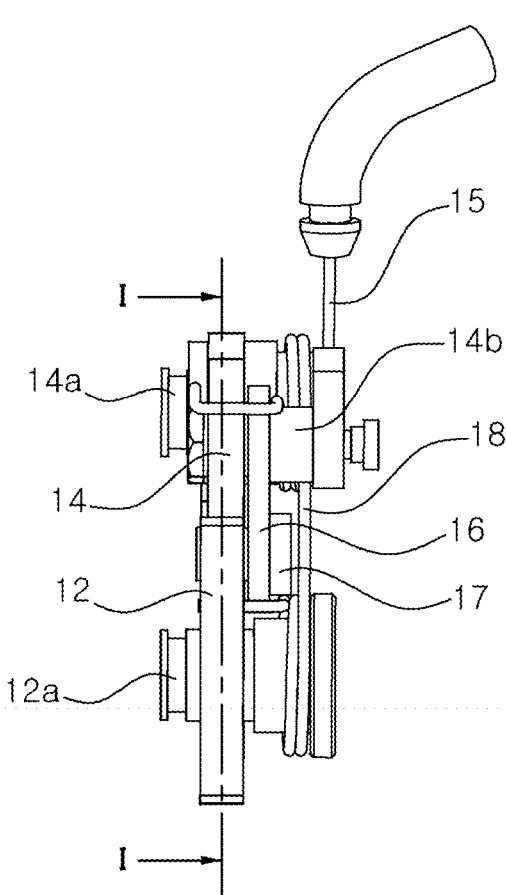
FIG. 8 is a side view of the latch assembly configured for maintaining the locking state according to an exemplary embodiment of the present disclosure.

As shown in FIG. 7, the pawl cable pin 14*b* and the pawl pin 17 are fastened at locations spaced from each other in the bracket 16, so that the pawl cable pin 14*b* and the pawl pin 17 are integrated. Accordingly, when the cable 15 is pulled, the pawl pin 17 is located only in the pawl guide groove 14*c*.

Meanwhile, when the pawl cable pin 14*b* is connected to the pawl 14, the pawl cable pin 14*b* is also provided on the pawl 14 to be slidable by a certain distance so that the pawl pin 17 is separated from the locking groove 12*c* and slid to the pawl guide groove 14*c*. In other words, by forming a pin guide groove 14*d* including the shape of the long hole in the pawl 14, and mounting the pawl cable pin 14*b* to be connected to the pin guide groove 14*d*, the pawl cable pin 14*b* slides inside the pin guide groove 14*d*.

When the passenger operates the lever to release the latch assembly to pull the cable 15, the locking groove 12*c*, the pawl guide groove 14*c*, the pawl 14, and the pin guide groove 14*d* are located on a virtual straight line so that the pawl pin 17 may be moved without loss of the passenger's operating force, and the pawl 14 may be rotated.

An operation of the latch assembly configured for maintaining the locking state according to an exemplary embodiment of the present disclosure including the above configuration will be referred to as follows.

Figure 5:
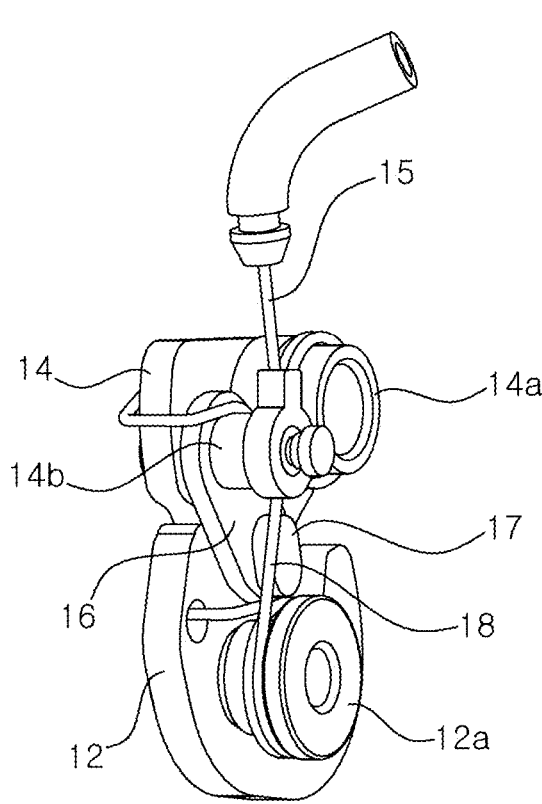
FIG. 5 and FIG. 6 are perspective views showing a latch assembly configured for maintaining a locking state according to an exemplary embodiment of the present disclosure.
Figure 6:
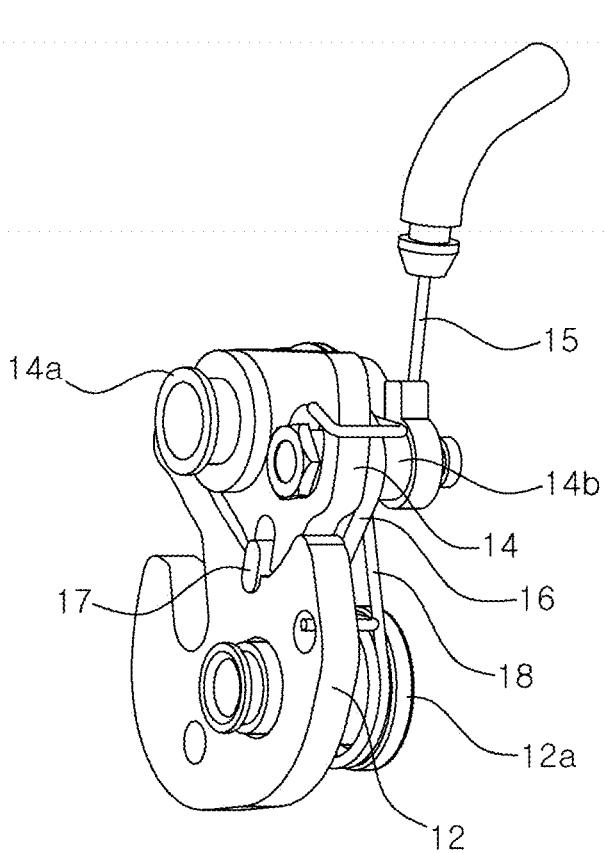
Figure 9:
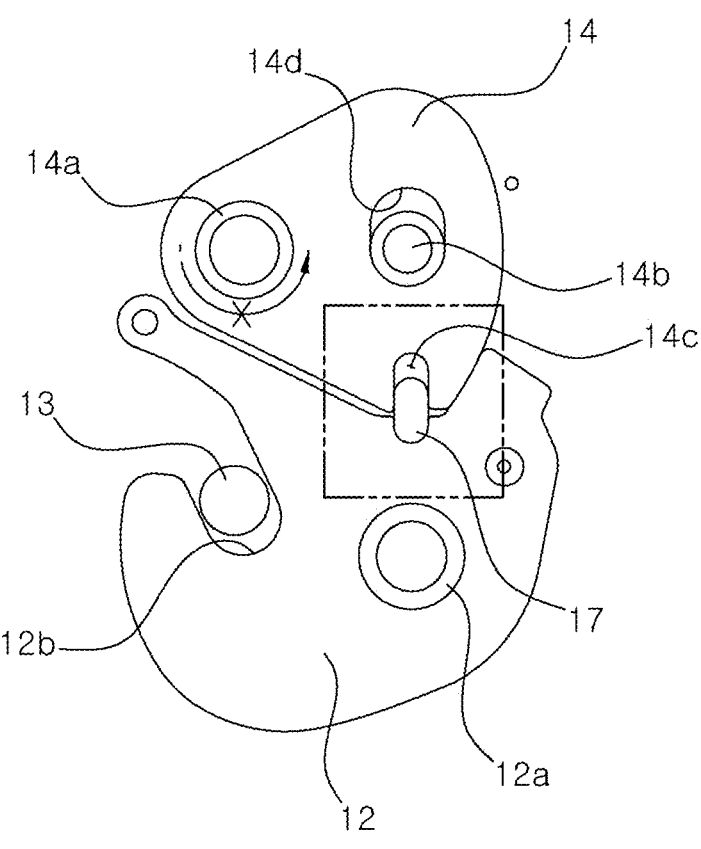
FIG. 9 is a cross-sectional view showing the pawl and the locking plate in a state in which the latch assembly configured for maintaining the locking state according to an exemplary embodiment of the present disclosure is locked.

To maintain the state of the seat, the state in which the latch assembly is locked is shown in FIGS. 5, 6 and 9. In the instant state, because the pawl pin 17 is fitted into portions of the pawl guide groove 14*c* and the locking groove 12*c*, respectively, the pawl 14 and the locking plate 12 may not be rotated even when inertia or an external force acts on the latch assembly, so that the locking state is maintained as it is.

Figure 11:
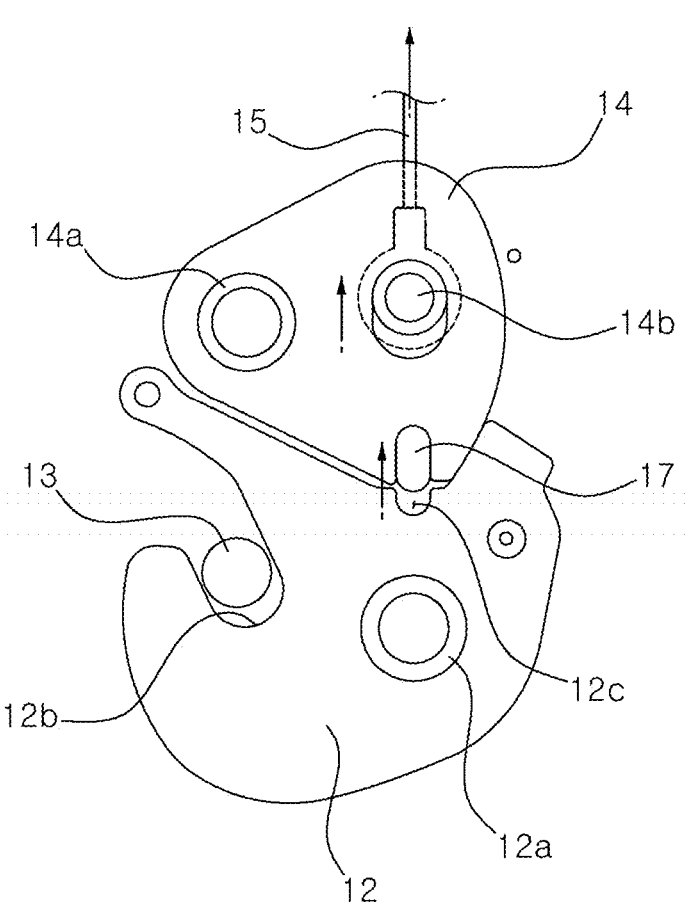
FIG. 11 is a cross-sectional view showing the pawl and the locking plate in a state in which a cable is pulled in the latch assembly configured for maintaining the locking state according to an exemplary embodiment of the present disclosure.

Meanwhile, when the passenger operates the lever to unlock the latch assembly, the cable 15 is pulled. As shown in FIG. 11, in an initial stage when the cable 15 is pulled, the pawl cable 15 located at the end portion of the cable 15 is pulled, and the pawl pin 17 integrally fastened thereto is also pulled in a direction in which the cable 15 is pulled together.

When the pawl pin 17 is pulled by the cable 15, the cable 15 is separated from the locking groove 12*c*, and all of the pawl pins 17 are located inside the pawl guide groove 14*c*. When all of the pawl pins 17 are located inside the pawl guide groove 14*c*, the pawl 14 and the locking plate 12 are in a state of being rotatable with each other.

Figure 12:
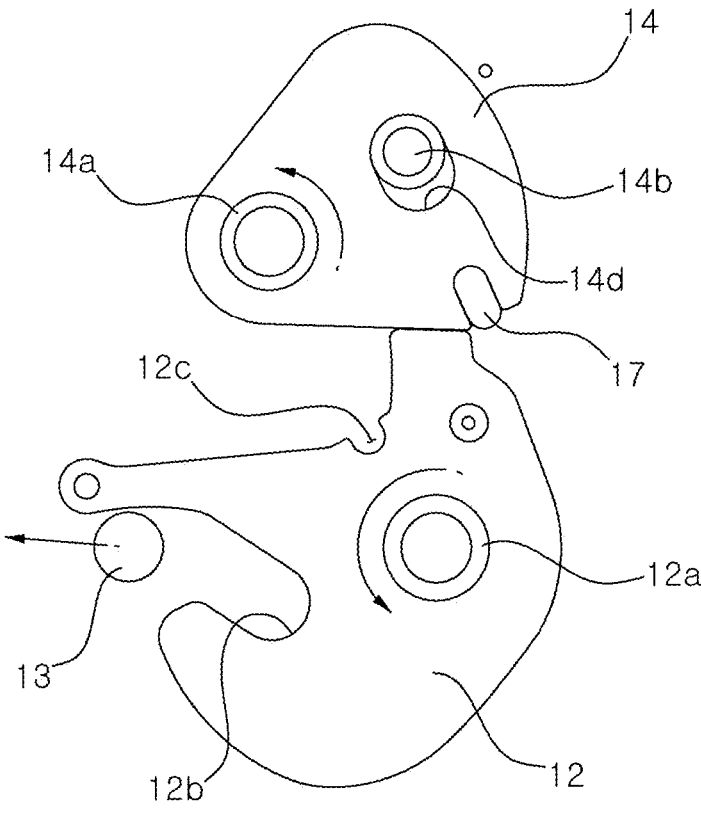
FIG. 12 is a cross-sectional view showing the pawl and the locking plate in a state in which the latch assembly configured for maintaining the locking state according to an exemplary embodiment of the present disclosure is unlocked.

Thereafter, in the state in which the cable 15 is continuously pulled, the cable 15 rotates the pawl 14 so that the engagement between the pawl 14 and the locking plate 12 is released (see FIG. 12). In the state in which the pawl 14 is not engaged with the locking plate 12, the locking plate 12 is rotated in a direction releasing the restraint of the striker 13, and the latch assembly is in an unlocking state.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A latch assembly capable of maintaining a locking state thereof, the latch assembly comprising:
a rotatable locking plate that selectively receives a striker;
a rotatable pawl engaged with the locking plate to prevent rotation of the locking plate, thereby maintaining the locking state of the latch assembly, in which the locking plate restrains the striker, and the pawl is separated from the locking plate when the pawl is rotated by a cable coupled to the pawl to release restraint of the striker by the locking plate, so as to place the latch assembly in an unlocking state of the latch assembly; and
a pawl pin provided between the pawl and the locking plate and configured to prevent a rotation of the pawl and the rotation of the locking plate in the locking state by restraining the rotation of the pawl and the rotation of the locking plate, wherein the pawl pin enables the rotation of the pawl and the rotation of the locking plate when actuation of the pawl is initiated to release the latch assembly from the locking state to the unlocking state,
wherein the pawl pin is provided to be simultaneously fitted into the pawl and the locking plate in the locking state of the latch assembly, and provided to be fitted into the pawl when the cable is pulled to actuate the pawl and initiate the release of the latch assembly from the locking state to the unlocking state,
wherein an end portion of the cable is fixed to a pawl cable pin provided in the pawl to be slidable within a predetermined distance in the pawl,
wherein the pawl pin is interlocked with the pawl cable pin,
wherein the latch assembly further comprises a bracket, on which the pawl cable pin and the pawl pin are fastened, so as to be spaced from one another on the bracket such that the pawl pin is interlocked with the pawl cable pin, and
wherein the pawl cable pin and the pawl pin are fastened to the bracket at fixed positions.

2. The latch assembly of claim 1,
wherein the pawl pin enables the rotation of the pawl and the rotation of the locking plate when the actuation of the pawl is initiated by the cable being pulled.

3. The latch assembly of claim 1,
wherein when a first end portion of the pawl pin is accommodated in a locking groove of the locking plate and a second end portion of the pawl pin is accommodated in a pawl guide groove of the pawl in the locking state of the latch assembly, the rotation of the pawl and the rotation of the locking plate are prevented.

4. The latch assembly of claim 3,
wherein when the releasing of the latch assembly from the locking state to the unlocking state begins, the pawl pin is located inside the pawl guide groove.

5. The latch assembly of claim 3,
wherein the pawl pin is interlocked with the cable via the interlocking of the pawl pin with the pawl cable pin by the bracket and is located inside the pawl guide groove when the cable is pulled.

6. The latch assembly of claim 3,
wherein the locking groove and the pawl guide groove are formed in the locking plate and the pawl, respectively, so as to communicate with each other in the locking state of the latch assembly.

7. The latch assembly of claim 1,
wherein a pin guide groove is disposed in the pawl, and the pawl cable pin is slidable in the pin guide groove and slidable within the predetermined distance, which is defined by the pin guide groove.

8. The latch assembly of claim 7, wherein in the locking state of the latch assembly, a locking groove of the locking plate, a pawl guide groove of the pawl, at least a portion of the pawl, and the pin guide groove are located on a virtual straight line.

9. A latch assembly capable of maintaining a locking state thereof, the latch assembly comprising:
a rotatable locking plate selectively receiving a striker;
a rotatable pawl engaged with the locking plate to prevent rotation of the locking plate, thereby maintaining the locking state of the latch assembly, in which the locking plate restrains the striker, and the pawl is separated from the locking plate when rotated by a cable coupled to the pawl to release restraint of the striker from the locking plate, thereby placing the latch assembly in an unlocking state of the latch assembly; and
a pawl pin simultaneously engaged with the locking plate and the pawl in the locking state before the cable is pulled, and engaged with the pawl after the cable is pulled,
wherein the pawl pin is provided to be engaged with the pawl when the cable is pulled,
wherein a pawl cable pin is provided at an end portion of the cable, and the pawl pin and the pawl cable pin are connected to each other by a bracket, so that the pawl pin is interlocked with the cable, and
wherein the pawl cable pin and the pawl pin are fastened to the bracket at fixed positions.

10. The latch assembly of claim 9,
wherein the pawl cable pin is slidably provided in a pin guide groove formed in the pawl.

11. The latch assembly of claim 10, wherein when the latch assembly is in the locking state, a locking groove of the locking plate, a pawl guide groove of the pawl, at least a portion of the pawl, and the pin guide groove are located on a virtual straight line.

12. A latch assembly capable of maintaining a locking state thereof, the latch assembly comprising:

a rotatable locking plate that selectively receives a striker;

a rotatable pawl comprising a first locking part engaged with the locking plate to prevent rotation of the locking plate, thereby maintaining the locking state of the latch assembly, in which the locking plate restrains the striker, and the pawl is separated from the locking plate when the pawl is rotated by a cable coupled to the pawl to release restraint of the striker by the locking plate, so as to place the latch assembly in an unlocking state; and a pawl pin provided between the pawl and the locking plate and configured to prevent a rotation of the pawl and the rotation of the locking plate in the locking state of the latch assembly by restraining the rotation of the pawl and the rotation of the locking plate, and the pawl pin enables the rotation of the pawl and the rotation of the locking plate when the pawl is actuated to release the latch assembly from the locking state to the unlocking state, wherein an end portion of the cable is fixed to a pawl cable pin provided in the pawl to be slidable within a predetermined distance in the pawl, thereby coupling the cable to the pawl, and wherein the pawl pin, which is provided to be simultaneously fitted into the pawl and the locking plate in the locking state of the latch assembly, is interlocked with the pawl cable pin, wherein the latch assembly further comprises a bracket, on which the pawl cable pin and the pawl pin are fastened, so as to be spaced from one another on the bracket such that the pawl pin is interlocked with the pawl cable pin, wherein the pawl cable pin and the pawl pin are fastened to the bracket at fixed positions.

* * * * *